Nov. 18, 1952     J. A. LARCÉN ET AL     2,618,241
DRILL TURNING MECHANISM OF HAMMER DRILLS

Filed July 6, 1949     2 SHEETS—SHEET 1

Patented Nov. 18, 1952

2,618,241

UNITED STATES PATENT OFFICE 2,618,241

DRILL TURNING MECHANISM OF HAMMER DRILLS

Jan August Larcén, Stockholm, and Sven Laurentius Ytterfors, Stensberg, Sweden, assignors to Aktiebolaget Atlas Diesel, Sickla, near Stockholm, Sweden, a corporation of Sweden Application July 6, 1949, Serial No. 103,226
In Sweden July 6, 1948

7 Claims. (Cl. 121—7)

The present invention relates to compressed air driven hammer drills provided with a drill turning device comprising a compressed air driven reciprocating piston motor and means for transmitting the movement of the piston of said piston motor to a rotary movement of a drill bit. One object of the invention is to provide a simple and reliable drill turning mechanism of the above type which is fit for operation under the special conditions prevailing in a hammer drill and which is cheap and simple in manufacture. Further objects and features of the invention will be explained in connection with an embodiment of the invention described hereinbelow which is however by no means limiting for the invention which may be varied in several different ways within the scope of the claims.

Figure 1:
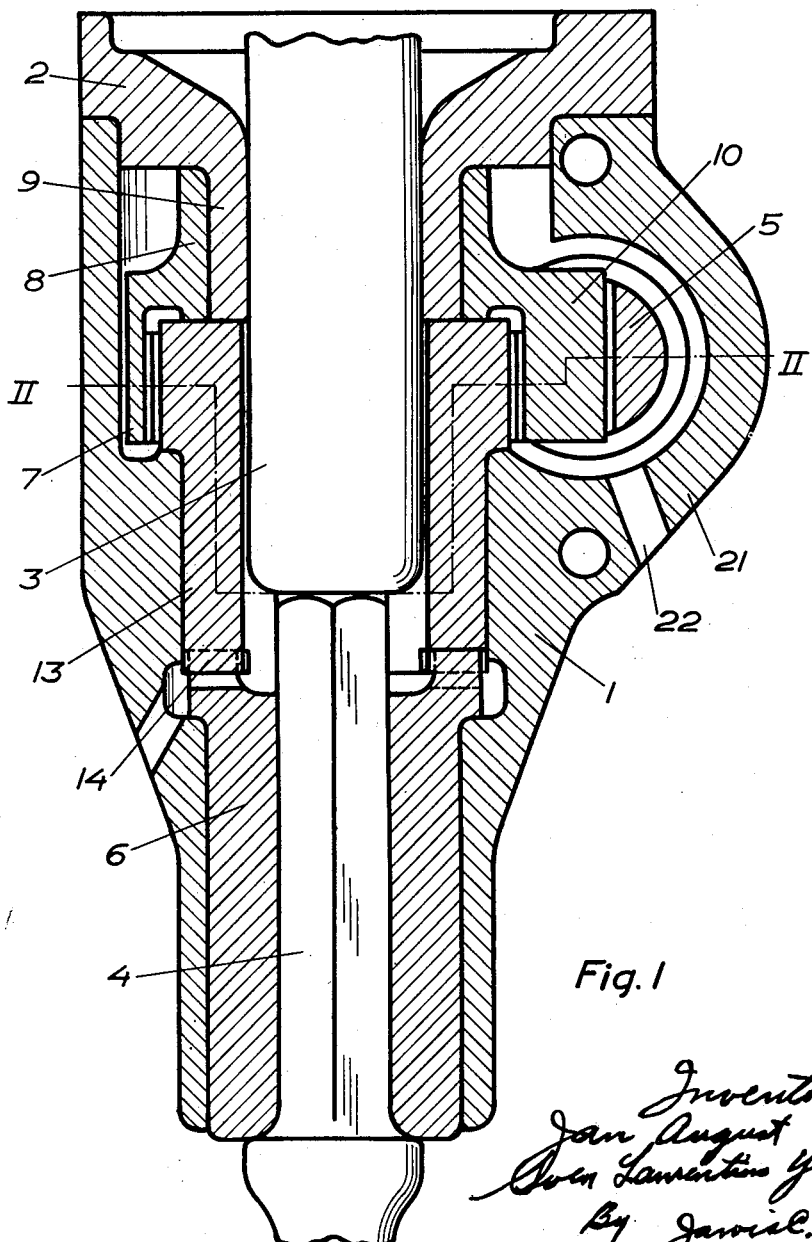
Figure 2:
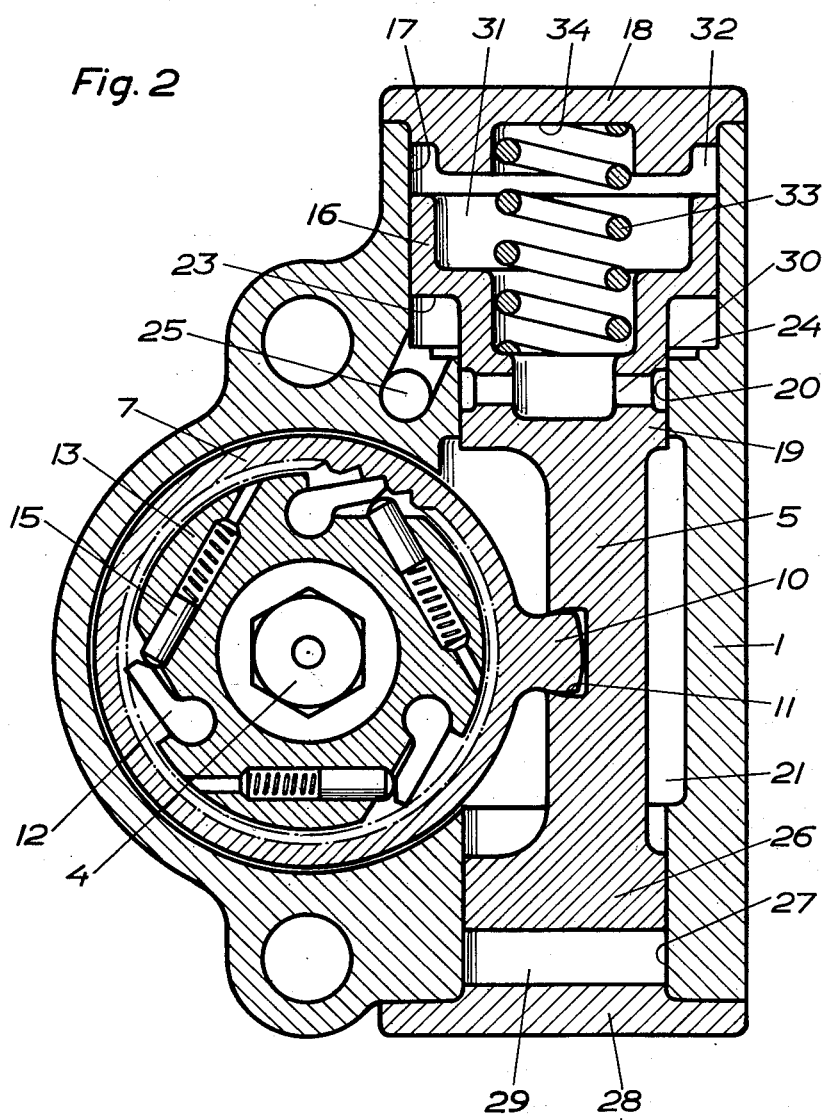

In the accompanying drawings one embodiment of a drill turning mechanism according to the invention is illustrated by way of example. Fig. 1 is a longitudinal section of the front end portion of a hammer drill in which the shank of a drill bit is inserted and receives blows from a hammer piston and a turning motion by means of a drill turning mechanism according to the invention operating independently of the hammer piston motion. Fig. 2 is a cross section on the line II—II in Fig. 1.

The drill turning mechanism illustrated in the drawings is disposed in a casing 1 secured to the front end 2 of a cylinder of a hammer drill having a differential type hammer piston 3, of which in Fig. 1 the small diameter piston extension only adapted to deliver the blows to a shank 4 of the drill bit is shown. As is obvious from Fig. 1 the piston 3 delivers the blows directly to the shank 4 of the drill bit, but the invention may naturally also be employed in drills in which the hammer piston delivers blows to the drill bit shank through an intermediate block. The drill turning motor has a differential piston 5 reciprocable in an auxiliary cylinder in the casing 1 extending in the transverse direction of the main cylinder and the drill bit. Said piston 5 rotates a drill chuck 6 through the intermediation of a pawl and ratchet mechanism. The drill chuck 6 is journalled in the casing 1 and fits the drill shank 4. The pawl and ratchet mechanism consists of an internally toothed ring 7 journalled with a boss 8 on a cylindrical portion 9 of the lower head 2 of the main cylinder of the drill. The ring 7 has a projection 10, which engages a recess 11 in the differential piston 5, and the teeth of the ring cooperate with pawls 12 mounted in a sleeve member 13 which by means of a claw coupling 14 is connected with the drill chuck 6. The sleeve member 13 contains spring loaded plungers 15 which serve to press the pawls 12 into engagement with the toothed ring 7.

The differential piston 5 is provided at one end with a piston section or portion 16 with large diameter which is movable in a cylinder portion 17 of the auxiliary cylinder which is closed at the outer end by a cover 18. The piston 5, furthermore, has a piston section or portion 19 with reduced diameter movable in a cylinder portion 20 extending from the bottom of the cylinder portion 17 to a space 21 in the casing 1 which through a passage 22 communicates with the atmosphere. Between the piston portions 16 and 19 the differential piston forms an annular end surface 23 which in one direction confines an annular cylinder chamber 24 which by means of a passage 25 communicates with the compressed air supply of the drill. At the opposite end of the piston 5 a cylindrical guide portion 26 is formed which is guided in a cylinder portion 27 of the casing 1. A cover 28 closes the outer end of the cylinder portion 27 and between said cover and the piston portion 26 an air cushion 29 is formed. The small piston portion 19 is provided with passages 30 which are in uninterrupted communication with a space 31 formed within the piston portions 16 and 19. The cover 18 and the cylinder 17 cooperate to form an annular pocket 32 into which the piston portion 16 moves during its motion towards the cover 18. The space 31 within the piston portions 16 and 19 may, as illustrated in Fig. 2, contain a spring 33 which rests with one end on the piston 5 and with the other end in a recess 34 in the cover 18. However, said spring may sometimes be dispensed with.

The drill turning mechanism above described operates in the following manner:

When the drill is at rest and compressed air is not supplied to the passage 25 the spring 33 tends to move the piston 5 towards the cover 28. When compressed air is supplied to the passage 25 the air acts on the annular end surface 23 so that the differential piston 5 is moved towards the cover 18 against the action of the spring 33. The piston 5 then moves the toothed ring 7 which through the pawls 12, the sleeve member 13 and the drill chuck 6 transmits the motion of the auxiliary piston 5 to a turning motion of the drill shank 4. When the piston 5 has moved so far towards the cover 18 that the openings of the passages 30 are uncovered then compressed air flows through the passages 30 into the space 31 and acts upon the whole area of the large piston portion 16 so that the piston 5 is displaced towards the cover 28. Since the pawl and ratchet mechanism does not make appreciable resistance to said motion the piston 5 is thrown towards the air cushion 29 so far that the openings of the passages 30 are uncovered at the lower edge of the cylinder portion 20 in Fig. 2 and the air in the space 31 then flows through the space 21 and the passage 22 to the atmosphere. The air pressure on the annular end surface 23 now again overtakes the pressure in the space 31 and moves the piston 5 towards the cover 18 simultaneously causing a turning movement of the drill bit. The same operation cycle is repeated as long as compressed air is supplied through the passage 25.

The embodiment of the invention described hereinabove should only be considered as an example and the invention may be modified in several different ways within the scope of the claims. For instance, the spring 33 may be omitted. However, it is then not always certain that the piston 5 is in such a position when compressed air is supplied that the turning device starts to operate. A slight turning movement of the drill relative to the drill bit, however, will then bring the piston 5 into such a position that the turning mechanism starts to operate. The illustrated pawl and ratchet mechanism 7, 12 and 13 may be replaced by other mechanisms capable of transmitting turning or oscillating rotary motion from an auxiliary piston to a drill bit. The auxiliary piston 5 may be arranged to produce only an oscillatory movement of the drill bit.

What we claim is:

1. In a compressed air driven hammer drill, a main cylinder, a hammer piston operable in said main cylinder, a valveless reciprocating compressed air driven drill turning motor having a cylinder and a piston movable in said cylinder, passages for conveying compressed air to the drill turning motor cylinder, passages for conveying air from the drill turning motor cylinder, means on said turning motor piston for controlling the flow of air through said passages, and means for transmitting the motion of the turning motor piston into a rotary motion of a drill bit.

2. In a compressed air driven hammer drill, a main cylinder, a hammer piston operable in said main cylinder, an auxiliary cylinder, a differential piston movable in said auxiliary cylinder, a piston portion on said differential piston having small diameter, a piston portion on the differential piston having large diameter, means on said small piston portion for controlling the flow of air to and from said auxiliary cylinder, and means for transmitting the motion of said differential piston into a rotary motion of a drill bit.

3. In a compressed air driven hammer drill, a main cylinder, a hammer piston operable in said cylinder, an auxiliary cylinder, a differential piston movable in said auxiliary cylinder, a piston portion on said differential piston having small diameter, a piston portion on the differential piston having large diameter, a passage opening on the small piston portion and communicating with a space confined by the large end face of the large piston portion, said passage connecting said space alternately with a compressed air supply and an air exhaust passage as the piston reciprocates, and means for transmitting the motion of the differential piston into a rotary motion of a drill bit.

4. In a compressed air driven hammer drill, a main cylinder, a hammer piston operable in said main cylinder, an auxiliary cylinder, a differential piston movable in said auxiliary cylinder, a piston portion on said differential piston having small diameter, a piston portion on the differential piston having large diameter, means on said small piston portion for controlling the flow of air to and from said auxiliary cylinder, a third piston portion on said differential piston, means for guiding said third piston portion, and means for transmitting the motion of the auxiliary piston into a rotary motion of a drill bit engaging said auxiliary piston between said third piston portion and the small and large piston portions.

5. A hammer drill comprising a casing, a reciprocable hammer mounted for reciprocation therein, a drill having its shank mounted in said casing for reciprocation upon being struck by said hammer and for turning in said casing, a cylinder closed at one end mounted on said casing, a first portion of said cylinder at said one end being of substantial diameter, a second portion of said cylinder adjacent said first portion being of less diameter than said first portion, an inlet port opening into said first portion of the cylinder adjacent said second portions, a piston reciprocably mounted in said cylinder having a first section operated in said first portion and a second section operative in said second portion, said piston being provided with a passage communicating with said port and with the interior of said cylinder adjacent said one end thereof and means operatively connecting said piston and said drill for turning said drill during the operation thereof.

6. A hammer drill comprising a casing, a reciprocable hammer mounted for reciprocation therein, a drill having its shank mounted in said casing for reciprocation upon being struck by said hammer and for turning in said casing, a cylinder closed at one end mounted on said casing, a first portion of said cylinder at said one end being of substantial diameter, a second portion of said cylinder adjacent said first portion being of less diameter than said first portion, an inlet port opening into said first portion of the cylinder adjacent said second portion, a piston reciprocably mounted in said cylinder having a first section operative in said first portion and a second section operative in said second portion, said piston being provided with a passage communicating with said port and with the interior of said cylinder adjacent said one end thereof, a spring urging said piston away from said one end of said cylinder, and means operatively connecting said piston and said drill for turning said drill during the operation thereof.

7. A hammer drill comprising a casing having a hammer cylinder mounted thereon, a hammer piston mounted in said cylinder for reciprocatory movement, a drill arranged in alignment with said hammer piston and mounted in said casing for reciprocating and turning movement, a turning cylinder mounted on said casing, a turning piston mounted in said turning cylinder for reciprocating movement, an inlet and exhaust port communicating with said cylinder, said turning piston providing the sole means for closing and opening said inlet port whereby the turning piston is caused to reciprocate, and means connecting said turning piston and said drill whereby reciprocating movement of said turning piston causes turning of said drill.

JAN AUGUST LARCÉN.
SVEN LAURENTIUS YTTERFORS.

REFERENCES CITED

The following references are of record in the file of this patent:

UNITED STATES PATENTS

| Number | Name | Date |
|---|---|---|
| 951,465 | Taylor | Mar. 8, 1910 |
| 1,086,625 | Smith | Feb. 10, 1914 |
| 1,097,997 | Taylor | May 26, 1914 |
| 1,326,245 | Worthen | Dec. 30, 1919 |
| 1,390,787 | Hultquist | Sept. 13, 1921 |
| 1,621,663 | Gartin | Mar. 22, 1927 |
| 1,779,645 | Smith Sr., et al. | Oct. 28, 1930 |
| 2,001,190 | Ginter | May 14, 1935 |
| 2,225,531 | Charles | Dec. 17, 1940 |

FOREIGN PATENTS

| Number | Country | Date |
|---|---|---|
| 76,744 | Sweden | Mar. 21, 1933 |